US010195946B2

(12) United States Patent
Ambrosio (10) Patent No.: US 10,195,946 B2
(45) Date of Patent: Feb. 5, 2019

(54) VEHICLE POWER SHARING AND GRID CONNECTION SYSTEM FOR ELECTRIC MOTORS AND DRIVES (71) Applicant: DG Systems LLC, Smithtown, NY (US)

(72) Inventor: Joseph Mario Ambrosio, Smithtown, NY (US)

(73) Assignee: DG Systems, Inc., Smithtown, NY (US)

( * ) Notice: Subject to any disclaimer, the term of this patent is extended or adjusted under 35 U.S.C. 154(b) by 57 days.

(21) Appl. No.: 15/667,913

(22) Filed: Aug. 3, 2017

(65) Prior Publication Data
US 2017/0349050 A1 Dec. 7, 2017

Related U.S. Application Data (63) Continuation-in-part of application No. 14/245,673, filed on Apr. 4, 2014, now Pat. No. 9,731,609.

(51) Int. Cl.
B60L 11/18 (2006.01)
B60L 11/00 (2006.01)
B60L 11/04 (2006.01)
H02J 7/34 (2006.01)
H02J 1/10 (2006.01)

(52) U.S. Cl.
CPC ......... *B60L 11/1803* (2013.01); *B60L 11/005* (2013.01); *B60L 11/04* (2013.01); *H02J 1/10* (2013.01); *H02J 7/345* (2013.01); *B60L 2210/10* (2013.01); *Y02T 10/646* (2013.01); *Y02T 10/70* (2013.01); *Y02T 10/7005* (2013.01); *Y02T 10/7022* (2013.01); *Y02T 10/7077* (2013.01); *Y02T 10/7216* (2013.01)

(58) Field of Classification Search
CPC .................................... B60L 11/1803
USPC ........................................ 307/10.1
See application file for complete search history.

(56) References Cited

U.S. PATENT DOCUMENTS

| 2009/0058329 | A1* | 3/2009 | Ichikawa | B60W 20/13 318/139 |
| 2009/0230908 | A1* | 9/2009 | Soma | B60K 6/365 318/452 |
| 2015/0375621 | A1* | 12/2015 | Ono | B60L 1/003 307/10.1 |
| 2016/0052505 | A1* | 2/2016 | Zhou | B60L 7/14 701/22 |
| 2016/0261213 | A1* | 9/2016 | Garcha | B60L 11/1803 |

* cited by examiner

*Primary Examiner* — Joseph Chang
(74) *Attorney, Agent, or Firm* — Alfred M. Walker (57) ABSTRACT A power sharing system for electric motors and drives shares power between multiple power sources. Multiple motor drives share power between multiple energy sources, without the need for a DC to DC converter. A motor drive adapts the DC voltage range of the power source to either AC voltage or a different DC voltage range to operate one or more electric motors. Either a capacitor bank or a battery is directly connected to a motor drive's DC input. Two separate DC inputs exist, each able to operate at its own voltage and both feeding the same motor through separate motor drives, to allow batteries to be operated at one voltage level while capacitors are operated at another. The motor drives inherently cause power to flow between the motor and either power source, regardless of the relative voltages of the two sources, provided that each source is at a sufficient voltage to power the motor independently.

10 Claims, 9 Drawing Sheets

Use of a Switch

Figure 1: PRIOR ART Typical system, utilizing DC to DC converter

Figure 2: System of the invention, coupling two drives to one motor

Figure 2A: PRIOR ART Standard Grid Connected AC Motor Drive Inverter

Figure 2B: PRIOR ART Standard DC Source Connected AC Motor Drive Inverter

Figure 2C: System of Invention Using Encoder Emulator

Figure 2D: Use of a Switch

Figure 3: System of the invention, coupling two motors together

Figure 4: Vehicle Controller

Figure 5: Alternate Motor Coupling Method

Figure 6: Multiple DC Sources and AC Motor

VEHICLE POWER SHARING AND GRID CONNECTION SYSTEM FOR ELECTRIC MOTORS AND DRIVES

RELATED APPLICATIONS

This application is a continuation-in-part of application Ser. No. 14/245,673, filed Apr. 4, 2014 and claims priority pursuant to 35 U.S.C. § 120 therefrom. The '673 application is incorporated by reference herein.

FIELD OF THE INVENTION

The present invention relates to an electrical power distribution and sharing system for sharing power between multiple energy sources for vehicle propulsion.

BACKGROUND OF THE INVENTION

The present invention is directed to electric and hybrid-electric vehicles, which rely on electric motors and drives for propulsion and braking assistance. The vast majority of these vehicles rely on battery packs with optimized energy density as the primary energy storage system. As battery driven systems become more prevalent, engineers are beginning to discover limitations with a battery only system. One major limitation is that the longevity of the battery is drastically affected by transient loads that are applied during acceleration and regeneration. Another limitation is that batteries do not efficiently recapture energy during regeneration. The second limitation reduces the usable range of an electric vehicle and greatly reduces the effectiveness of a hybrid vehicle. Both of these limitations can potentially be addressed through the use of a secondary source of energy that can more effectively provide short bursts of power for acceleration and quickly recapture energy during regenerative braking. An example of such a secondary energy storage system is an ultra-capacitor. Ultra-capacitors are a new type of capacitor, which has significantly greater energy storage capability over a traditional capacitor. Pairing an ultra-capacitor with a battery is not the only possible embodiment of the invention. Other energy storage systems can be paired where one has most of the energy capacity and the other has most of the power capacity. In addition, energy storage systems could be paired for purposes other than splitting between high energy and high power. For example, if a vehicle has two removable battery packs, it might be advantageous to deplete one battery pack before the other so the empty pack could be replaced mid-trip. For simplicity's sake, this document uses a battery as the primary storage and an ultra-capacitor as the secondary storage device used for power.

Figure 1:
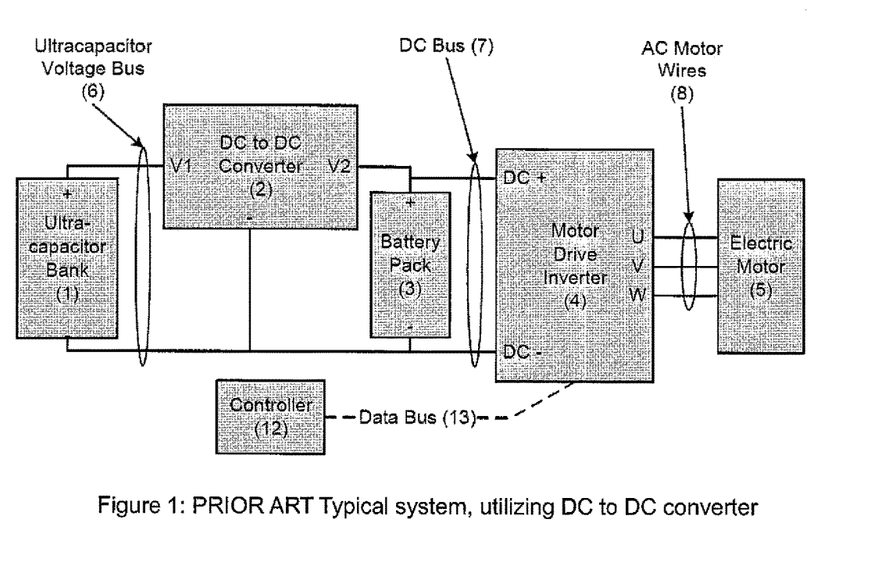
FIG. 1 is a block diagram of a Prior Art power system for a vehicle with an electric motor which utilizes a DC to DC converter.

As designers begin to investigate the use of ultra-capacitors in conjunction with batteries, they quickly discover it is a challenging task. Because batteries operate over a very narrow voltage range, while capacitors must operate across a broad voltage range, it is not practical to simply connect the capacitors and batteries in parallel. What is required is some power electronic device, which allows the motor drive to direct power to either the batteries or the capacitors at will, while allowing the batteries and capacitors to work at different voltages. The conventional solution to this problem is to use a DC to DC converter to adapt the voltage range of the capacitors to that of the batteries, while causing power to flow in either direction under some form of control. FIG. 1 shows the major components of a typical prior art system in which a DC to DC converter is used to couple an ultra-capacitor to a battery bank and motor drive.

There are two major problems with a DC to DC converter based power sharing scheme. The first problem is that the aforementioned type of DC to DC converter does not exist in the market today. The industry has not matured yet. As a result, converters are prohibitively expensive and require a substantial up-front investment of non-recurring engineering costs. Contrast this with the motor drive market, which is quite mature. There exist today a large number of off the shelf, cost optimized motor drives from which a designer may select. The second major problem with a DC to DC converter approach is that efficiency is lost in the power conversion process. In any motor drive system, some amount of efficiency is lost as power passes through the motor drive in order to power the motor. With a DC to DC converter, a second power conversion process takes place for one of the two power sources. This power conversion causes an additional loss of efficiency for the associated power source.

OBJECTS OF THE INVENTION

It is therefore an object of the present invention to provide an efficient power sharing system for electric motors and drives.

It is also an object of the present invention to provide an efficient power sharing and distribution system for electric and hybrid electric vehicles, which shares power between multiple energy sources, without the need for a DC to DC converter.

In addition, electric and hybrid electric vehicles use an AC inverter that couples the DC source to a poly phase AC motor. Those skilled in the art understand that there are at least two major types of commercially available AC inverters. One type is meant to couple a DC power bus and to provide power to an AC load, however it also possible to use the same inverter to provide power AC mains supply, which is referred to as "Vehicle to Grid". Vehicle to grid applications are used to load level the electric grid in peak demand times or to act a power backups during an outage. Typically AC mains inverters that interface with the AC grid are much more expensive than electric motor inverters because they are more highly specialized pieces of equipment. Few suppliers have worked to optimize the cost of such inverters and little competition exists in the marketplace. Conversely, AC electric motor drive inverters are very cost effective. Many commercially available AC motor drives have been cost-optimized and sold in high volumes. There the application of the drive inverters in grid supply also provides space and cost savings.

The main difference between an AC mains inverter and a motor drive inverter is the method of determining the phase and voltage of the generated AC waveform. An AC mains inverter must sense the instantaneous voltage of the AC mains, to which it is connected, and synchronize its output to those mains. An AC motor drive generates its AC voltage waveform in relation to the position of the motor's rotor. The AC motor drive senses the rotational position of the motor's rotor through an encoder and outputs an AC waveform accordingly. The most appropriate type of AC motor drive for this application is a synchronous motor drive, in which the AC voltage waveform must rotate in synchronism with the motor's rotor. A synchronous motor drive must know the exact rotational position of the rotor rather than simply knowing the motor's speed. The rotational position of the rotor is determined by an absolute encoder, which communicates the rotor position within one complete rotation of the shaft.

Another object of this invention is an optional encoder emulator, which is used to interface the AC motor drive to another AC motor drive or AC mains supply. The encoder emulator is the key to using low cost motor drives in applications which normally require AC mains inverters. The encoder emulator measures the instantaneous phase and frequency of the AC mains voltage and generates a simulated encoder position signal. The encoder position signal is then fed into an AC motor drive inverter to fool the inverter into thinking it is driving a motor. The AC output of the motor drive is connected to the AC mains (typically though an inductor), causing current to flow between the DC bus and the AC mains under control of the motor drive. Depending on whether positive or negative torque is requested, the motor drive can cause power to flow from the AC mains to the DC bus or from the DC bus to the AC mains.

It is also an object of the present invention to provide an AC motor drive inverter coupled to the AC mains, using a sensing interface with the addition of a switch between the system and AC mains.

Other objects which become apparent from the following description of the present invention.

SUMMARY OF THE INVENTION

The invention is an electrical power distribution and sharing topology, which utilizes multiple motor drives as the basis for sharing power between multiple energy sources. In a traditional Prior Art system, the motor is driven by one motor drive, which is connected to a Direct Current (DC) voltage bus. A motor drive adapts the DC voltage range of the power source to either AC voltage or a different DC voltage range in order to operate the motor. In such a system, either the capacitor or the battery is directly connected to the motor drive's DC bus.

Figure 2:
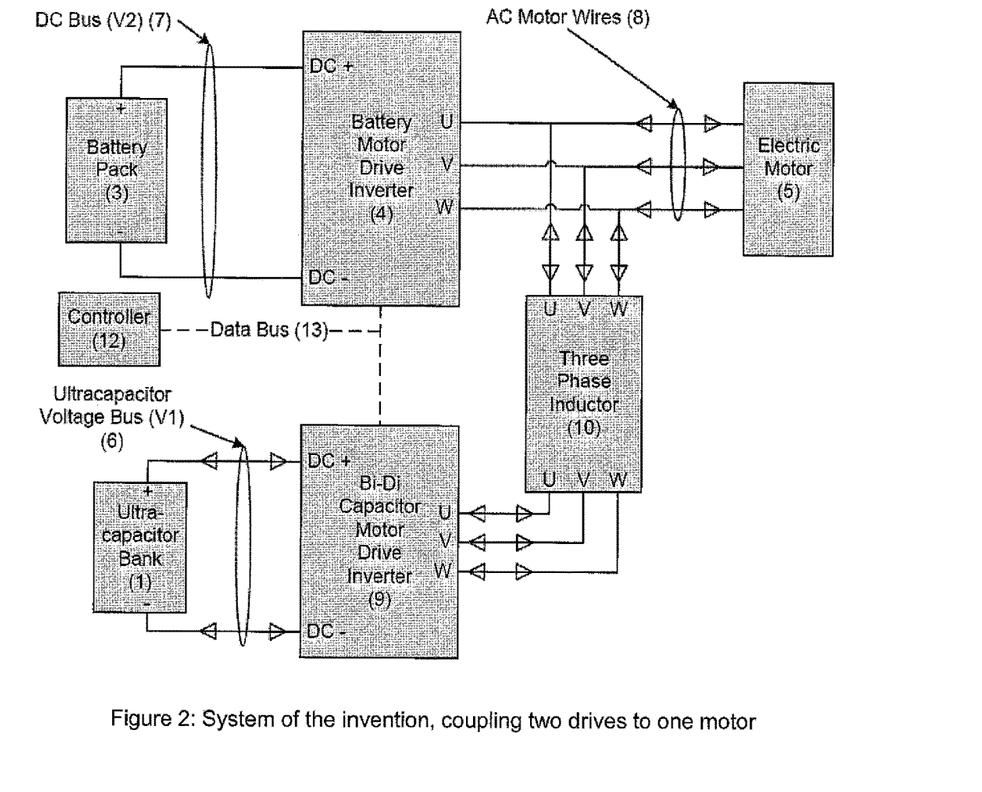
FIG. 2 is a block diagram of one embodiment of the present invention, which couples two drives to one electric motor, using two electric power sources.

In the power sharing system described in this invention, two DC buses exist, each able to operate at its own voltage and both feeding the same motor(as for example, in drawing FIG. 2 herein). For simplicity's sake, this document uses a battery as the first storage and an ultra-capacitor as the secondary storage device used for power.

The power sharing systems of the present invention, for electric motors and drives, share electric power between multiple energy sources in a vehicle or machine, without the use of a DC to DC converter.

In one embodiment, a primary motor drive inverter delivers a first AC current to an electric motor, such as, for example, through the AC motor wires of the electric motor. A first source of DC power, such as, for example, a battery pack, delivers a DC voltage to the first motor drive inverter, such as a battery motor drive inverter. Additionally, at least one further motor drive inverter, such as a capacitor motor driver inverter, delivers at least one further AC current to the AC motor, also, such as, for example through the AC motor wires of the electric motor, wherein further at least one further source of DC electric power, such as, for example, an ultra-capacitor bank, delivers a DC voltage to the secondary motor drive inverter. Optionally, the first and further inverters may be coupled via a three phase inductor. A controller which is preferably connected to both of the first and second motor drive inverters contains basic operational parameters and provides an interface to the vehicle or machine, whereby the controller matches varying torque demands of the electric motor with available AC currents from the aforementioned inverters. While two inverters are discussed herein, it is known to those skilled in the art that any number of a plurality of inverters and associated components can be used to drive the electric motor.

Further optionally, in this embodiment where first and second inverters are used to deliver power to a single electric motor, the system includes a device for sensing the phase of the AC power coming from one of the inverters to generate a simulated encoder signal for the second inverter. The system preferably provides drive in a vehicle whereby the secondary source of DC electric power (such as for example, an ultra-capacitor bank) is utilized for acceleration of the vehicle and for regeneration of the first DC power source, such as battery pack.

While a single motor, two power sources respectively, and two inverters respectively, are discussed in the first embodiment, it is known to those skilled in the art that any number of a plurality of inverters and associated power source components can be used to drive the electric motor of the first embodiment. For example, while the foregoing discussion refers to examples with first and second power sources and first and second inverters, it is known to those skilled in the art that two or more power sources and two or more inverters may be employed.

In a second embodiment, for a system in a vehicle or machine which shares electric power between multiple energy sources, there is provided a plurality of power systems. For example, a first power system in this second embodiment includes a first AC electric motor and a first motor drive inverter, such as a battery motor drive inverter, which delivers a first AC voltage to the first electric motor, such as, for example, through the AC motor wires of the first electric motor. In connection therewith, a first source of DC power, such as, for example, a battery pack, delivers a first DC voltage to the first motor drive inverter. A second power system of this second embodiment includes a second AC electric motor and a second motor drive inverter, such as, for example, a capacitor motor drive inverter, which delivers a second AC voltage to the second electric motor, preferably, for example, through its respective AC motor wires of the second electric motor. A second source of DC electric power, such as, for example, an ultra-capacitor bank, delivers a second DC voltage to the second motor drive inverter, such as a capacitor motor driver inverter. In this second embodiment, the first and second AC electric motors respectively, are mechanically coupled together, such as, for example, through a mechanical coupling to operate on a common load, wherein the respective first and second power systems operate at different DC voltage levels. A controller is connected to both of the respective first and second motor drive inverters of this second power sharing embodiment, to distribute power between the respective first and second sources of DC electric power, by modulating torque demands of the two motor drive inverters. The controller and associated data bus are connected to both respective inverters and both contain basic operational parameters providing an interface to a vehicle or machine in which the second embodiment is incorporated. In this second embodiment, the second power system is utilized for acceleration of the vehicle.

While two motors and two inverters are discussed in the second embodiment, it is known to those skilled in the art that any number of a plurality of inverters and associated power source components can be used to drive the plurality of two or more electric motors. For example, while the foregoing discussion refers to examples with first and second power sources and first and second inverters, it is known to those skilled in the art that two or more power sources and two or more inverters may be employed.

This system allows the batteries to be operated at one voltage level while the capacitors are operated at another. The motor drive inherently has the capability to cause power to flow between the motor drive and either power source, regardless of the relative voltages of the two sources, provided that each source is at a sufficient voltage to power the motor independently.

It should be noted that the typical power electronic topology of an AC motor drive may mandate that additional inductors or low-pass filters be placed between the two motor drives in order to facilitate filtering of unwanted switching voltages between the two drives. The proposed system has two major benefits. First, it utilizes off the shelf, cost optimized commercially available motor drives. Second, it eliminates a second level of power conversion, such as a traditional DC to DC converter, thereby increasing the overall efficiency of the system.

Figure 3:
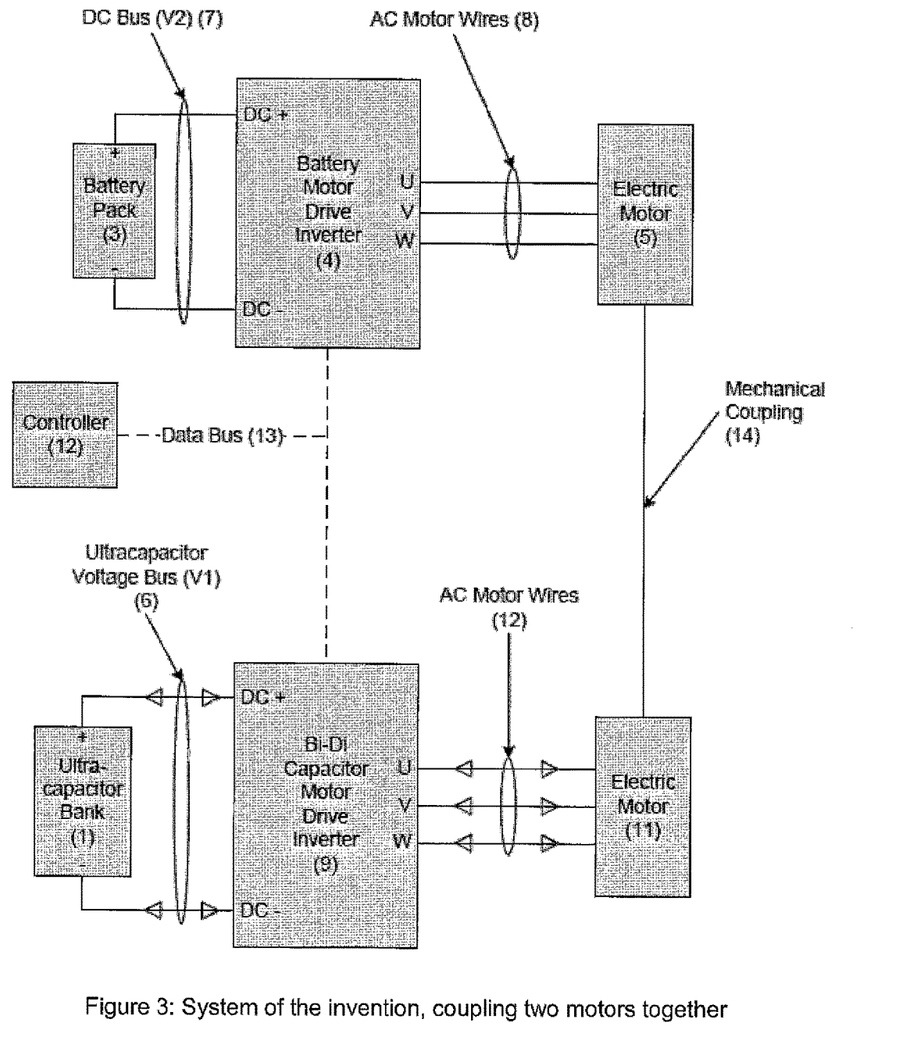
FIG. 3 is a block diagram of an alternate embodiment of the present invention, which couples two electric motors together, also using two electric power sources.

While this system is described as a means of combining ultra-capacitors with batteries, it is adaptable to other embodiments, with other applications. As an example, it may be used to combine power from two battery packs, while discharging the two batteries independently. In addition, it is not strictly necessary to use both drives to control one motor. As shown in FIG. 3, it is similarly possible to have each drive control its own motor, and then couple the two together into the drive train mechanically.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE DRAWINGS

The present invention has broad applications to many technical fields for a variety of articles. For illustrative purposes only, a preferred mode for carrying out the invention is described herein.

FIG. 1 shows the major components of a typical Prior Art vehicle power drive system in which a DC to DC converter is used to couple an ultra-capacitor to a battery bank and motor drive. The Motor Drive Inverter 4 is used to convert DC power from the DC Bus 7 into AC power, which is carried on the AC Motor Wires 8 to the provide power to the Electric Motor 5. The Motor Drive Inverter 4 operates at a particular voltage V2, which is constrained by the operational voltage range of the Battery Pack 3. The DC to DC Converter 2 adapts the voltage range V1 of the Ultra-capacitor Bank 1 to the voltage range V2 of the Battery Pack 3. All electrical power to the Electric Motor 5 flows through the Motor Drive Inverter (4) from the DC Bus (7). The DC to DC Converter (2) determines the level of power sharing between the Ultra-capacitor Bank 1 and the Battery Pack 3 by modulating the current flow between the two. The DC to DC Converter 2 is a costly item which is not readily available off the shelf. In addition, power is lost due to conversion efficiency when it is moved between the Ultra-capacitor Bank 1 and the DC Bus 7. There is also a Controller 12 and an associated Data Bus 13 that is connected to the Motor Drive Inverter 4 that contains the basic operational parameters and provides an interface to the vehicle or machine using the motor drive system.

FIG. 2 shows one possible embodiment of the proposed system, in which two power sources, a battery pack 3 and an ultra-capacitor bank 1, are coupled to one electric motor 5 via two motor drives without the need for a DC to DC converter. The Electric Motor 5 can now receive power from both the Battery Motor Drive Inverter 4 and the Capacitor Motor Drive Inverter 9. The Battery Motor Drive Inverter 4 drives the Electric Motor 5 with power from a storage element, such as the Battery Pack 3, via the DC Bus 7, operating at voltage V2. The Capacitor Motor Drive Inverter 9 drives the Electric Motor 5 with power from another storage element, such as the Ultra-capacitor Bank 1, via the Ultra-capacitor Voltage Bus 6, operating at voltage V1. The distribution of power between the two storage elements 1 and 3 is controlled by controlling the torque commands to the two Motor Drive Inverters 4 and 9 where Battery Motor Driver Inverter 4 controls power exchange of the battery pack 3 and where Capacitor Motor Drive Inverter 9 controls power exchange of Capacitor Bank 1. Additionally, depending on the designs of the two Motor Drive Inverters 4 and 9, it may be necessary to couple the two Inverters 4 and 9 together on the AC side via a Three Phase Inductor 10. Although the two inverters are synchronized as to frequency and phase, inductor 10 is used to prevent switching transients from one inverter to interfere with the other. In fact, three phase double stage filters such as the FVDT series from PREMO S.L. of Malaga, Spain or custom or standard power line inductors and filters from Scaffner EMC Inc. of Edison N.J. can also be used for this purpose. There is also a Controller 12 and an associated Data Bus 13, that is connected to the Motor Drive Inverter 4 and Capacitor Drive Inverter 9 that contains the basic operational parameters and provides an interface to the vehicle or machine using the invention. The invention also utilizes a device which senses the phase of the AC power coining from one of the Motor Drive Inverters 4 or 9 and generates a simulated encoder signal for the second inverter.

Figure 2A:
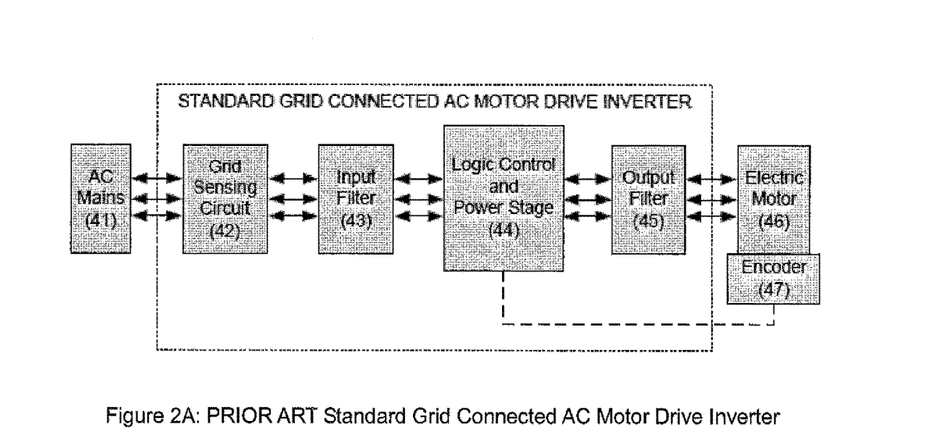
FIG. 2A shows a Prior Art block diagram of a typical AC mains connected inverter.

FIG. 2A shows a standard grid connected Motor Drive Inverter that can be purchased commercially. This device is connected to a typical AC Mains 41 and is comprised of a Logic Control and Power Stage 44 and uses a Grid Sensing Circuit 42 with and Input Filter 43 with and Output Filter 45 on its output before powering the AC Electric Motor 46 load.

It utilizes an Encoder 47 to monitor the position of the electric motor. The combined elements work together to provide control and operation of an AC motor in either speed on torque mode whereby the motor is providing motive force to keep a vehicle moving down the road. Typical Motor Drive Inverters do not work when the grid is not present thus back driving the grid is not possible. However through the use of the Encoder Emulator 46 as described below, the same inverter can be used to back feed the grid and provide power to an electric motor that provides motive power to a vehicle.

Figure 2B:
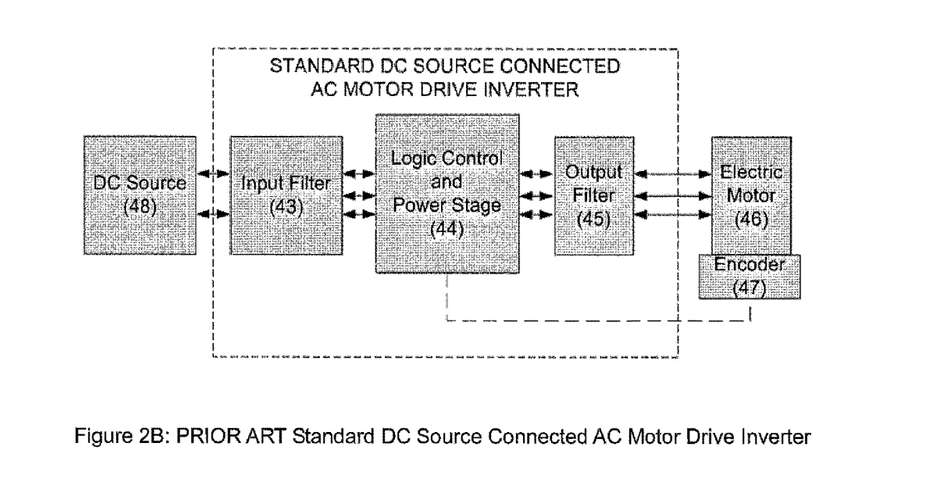
FIG. 2B shows a block diagram of a typical Prior Art AC motor drive inverter.

FIG. 2B shows a standard AC motor drive that uses a DC source for power. It uses all the components used in the grid connected inverter shown in FIG. 2A, but omits the Grid Sensing Circuit 42 since no grid is present, but powers the AC motor in the same manner.

Figure 2C:
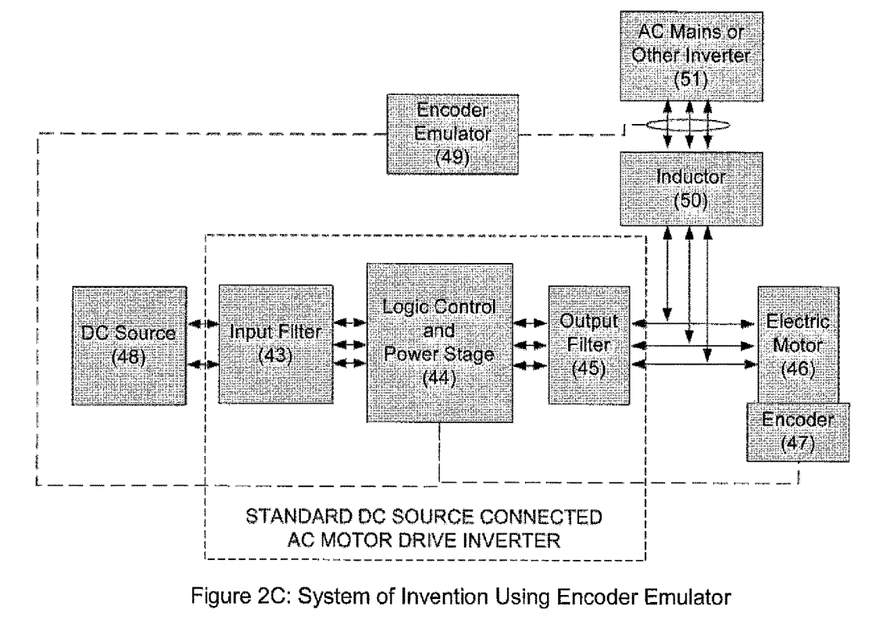
FIG. 2C shows an AC motor drive inverter coupled to the AC mains, using the invention as a sensing interface.

FIG. 2C shows the use of the Encoder Emulator 46 in the invention. The output of the inverter can be connected to an Electric Motor 46, the AC Mains or Other Inverter 51 through an Inductor 50 for power conditioning. In order to utilize the same Motor Drive Inverter hardware, the encoder input point is the same for the standard Encoder 47 or the Encoder Emulator 46. The system can be stationary or mobile such as stationary trailer that is electrically connected to a pole or a vehicle that plugs only when AC mains is required. It is important to note when AC Mains or Other Inverter 51 is an Inverter, the source can be a battery or ultra-capacitor bank.

Figure 2D:
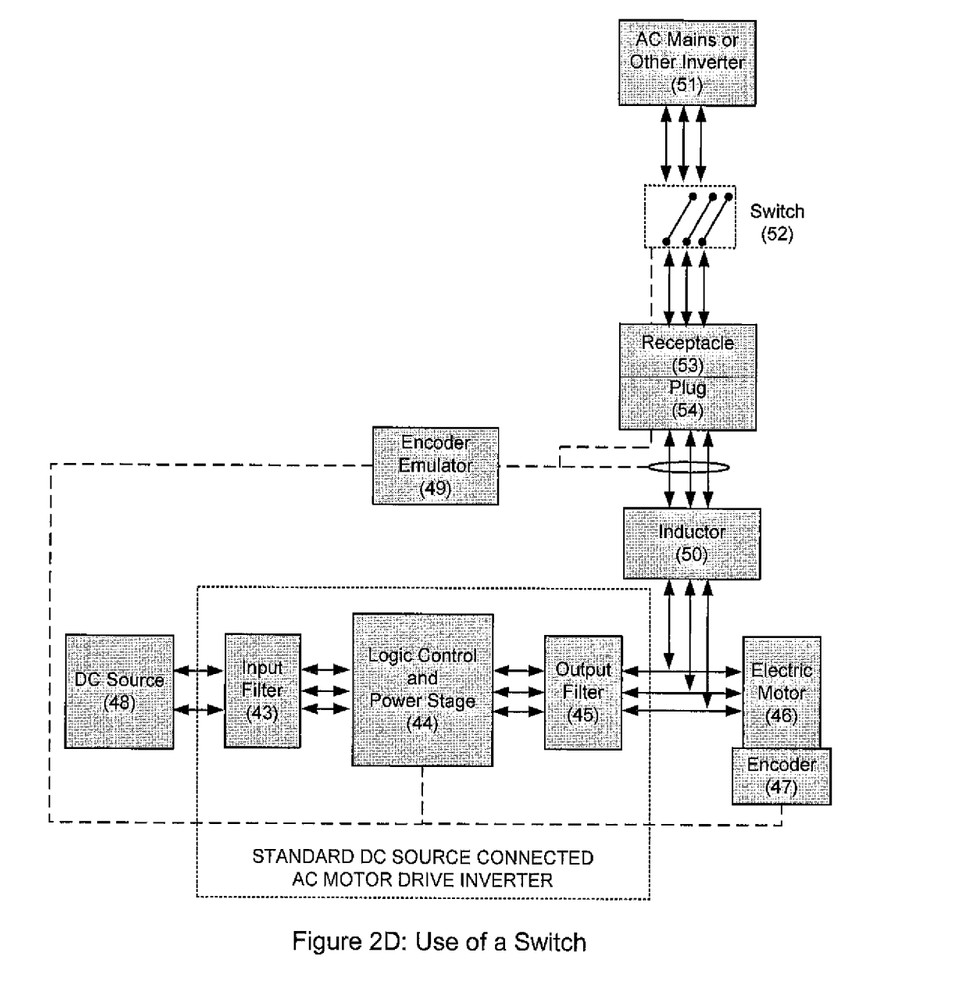
FIG. 2D shows an AC motor drive inverter coupled to the AC mains, using the invention as a sensing interface with the addition of a switch between the system and AC mains.

FIG. 2D shows the use of a switch 52 between the system and the AC mains. The switch 52 interrupts the connection from the system to grid. The switch 52 allows for intelligent control of the grid connection. The switch 52 is controlled by the logic controller 44. The logic controller 44 is polling the following information to allow or disallow the switch 52 from closing during Ground faults, Grid synchronization, Grid failure, or System errors, Electrical connections are intact when using a disconnect such as a removable plug 54. The plug 54 consists of a receptacle 53 and plug 54 that carries that AC power and data signal for the switch 52. It is important to note when AC Mains or Other Inverter 51 is an Inverter, the source can be a battery or ultra-capacitor bank.

Figure 4:
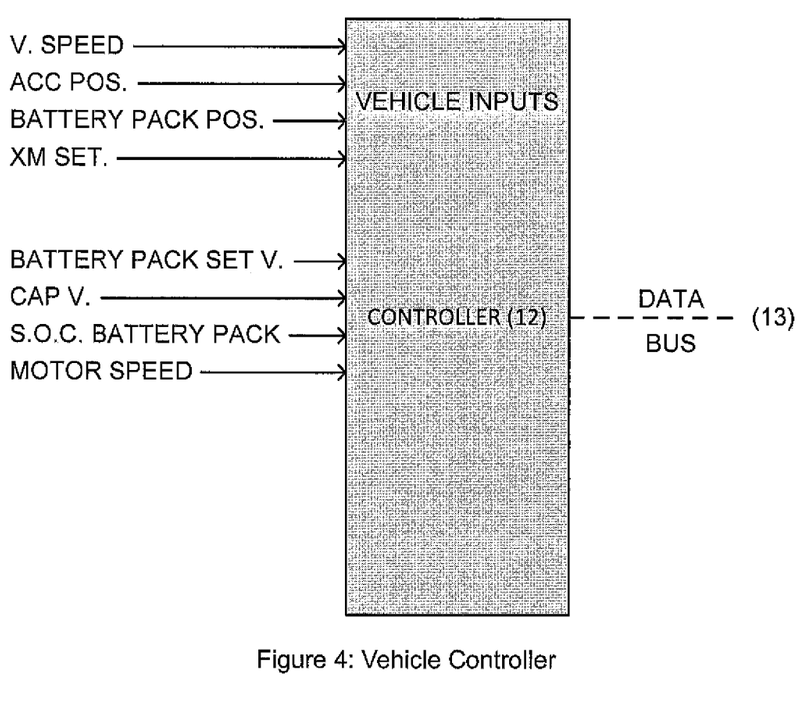
FIG. 4 is a block representing the controller with its set of inputs.

FIG. 4 shows a controller 12 block with some vehicle inputs and power source input parameters shown. The vehicle inputs are indicative of the current operating state of the vehicle such as vehicle speed, accelerator pedal position, brake pedal position, transmission gear (if applicable). The power source parameters include battery pack 3 voltage and state of charge, capacitor bank 1 voltage and state of charge (for diagnostic comparison), and motor 5 speed.

It is noted that inverter 9 which powers motor 5 from the ultra-capacitor bank 1 must also be a bi-directional type which recharges capacitor bank 1 during braking when motor 5 is used as an alternator to implement regenerative braking. This takes AC power generated by motor 5 and converts it to DC power to charge the capacitor bank during the braking phase. A good example of the general type of bi-directional inverter 9 is the MPS-100™ series bi-directional inverters from Dynapower Corporation of South Burlington, VT 05403.

FIG. 3 shows another possible embodiment of the proposed system, in which two power sources, a battery pack 3 and an Ultra-capacitor bank 1, are coupled to the mechanical system via two motor drives and two motors, without the need for a DC to DC converter. In this case, two independent motor drive systems are operating on a common load via some form of mechanical coupling. In the first system, power is exchanged between the Battery Pack 3 and the Electric Motor 5 via the Battery Motor Drive Inverter 4. In the second system, power is exchanged between the Ultra-capacitor Bank 1 and the Electric Motor 11 via the Capacitor Motor Drive Inverter 9. The two systems are able to operate at different DC voltage levels V1 and V2. Power is distributed between the two storage elements 1 and 3, such as Ultra-capacitor Bank 1 and Battery Pack 3, by modulation of the torque commands to the two Motor Drive Inverters 4 and 9, where Battery Motor Drive Inverter 4 controls power exchange of the battery pack 3 and where Capacitor Motor Driver Inverter 9 controls power exchange of the Ultra-capacitor Bank 1. The power from the two Electric Motors 5 and 11 is combined by a Mechanical Coupling 14, which could be a common shaft, a flexible coupling, a gear set, or one or more clutches to minimize windage losses, in cases where one of the motors is shut down as, for example, when the ultra-capacitor bank is depleted. There is also a Controller 12 and an associated Data Bus 13 that is connected to the Motor Drive Inverter 4 and Capacitor Drive Inverter 9 that contains the basic operational parameters and provides an interface to the vehicle or machine using the invention.

It is noted that in this second embodiment electric motor 11 need not be the same type as motor 5. In fact, motor 11 could be a brushless DC motor while motor 5 is a three-phase AC motor. In such a case, capacitor motor drive inverter 9 would be replaced by a regenerative (bi-directional) DC motor drive. Note that the use of two separate motors permits motor 11 to be physically small since it can be designed as an intermittent duty motor with lower heat dissipation demands.

Figure 5:
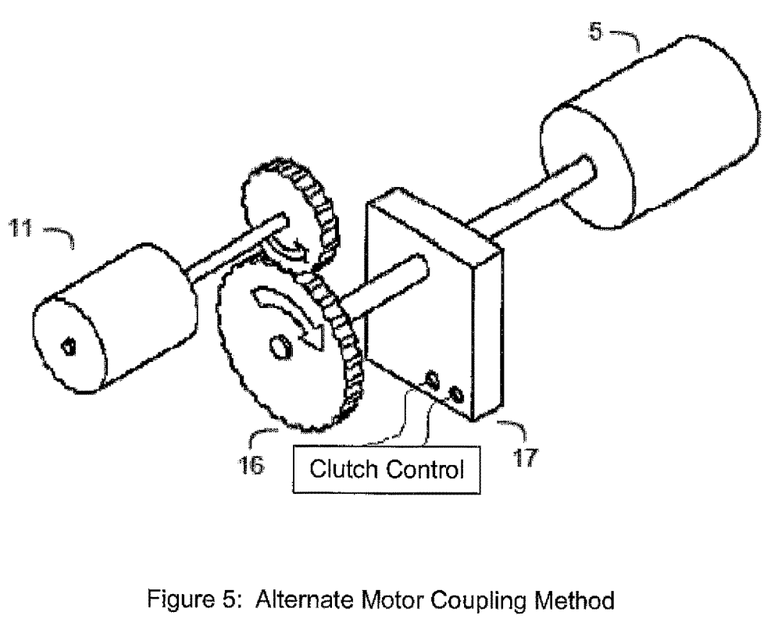
FIG. 5 is perspective schematic view of a two motor embodiment with a gear-set and an electrically operated clutch coupling the two motors.

FIG. 5 shows an alternative to the direct coupling of motors 5 and 11. Here, the coupling is achieved via gear-set 16 and electrically operated clutch 17. Note that the step-up in rotational speed from motor 5 to motor 11 is advantageous to generating higher voltages to quickly charge capacitor bank 1 while clutch 17 isolates gear-set 16 and motor 11 from the driving motor 5 when capacitor bank 1 is depleted.

Figure 6:
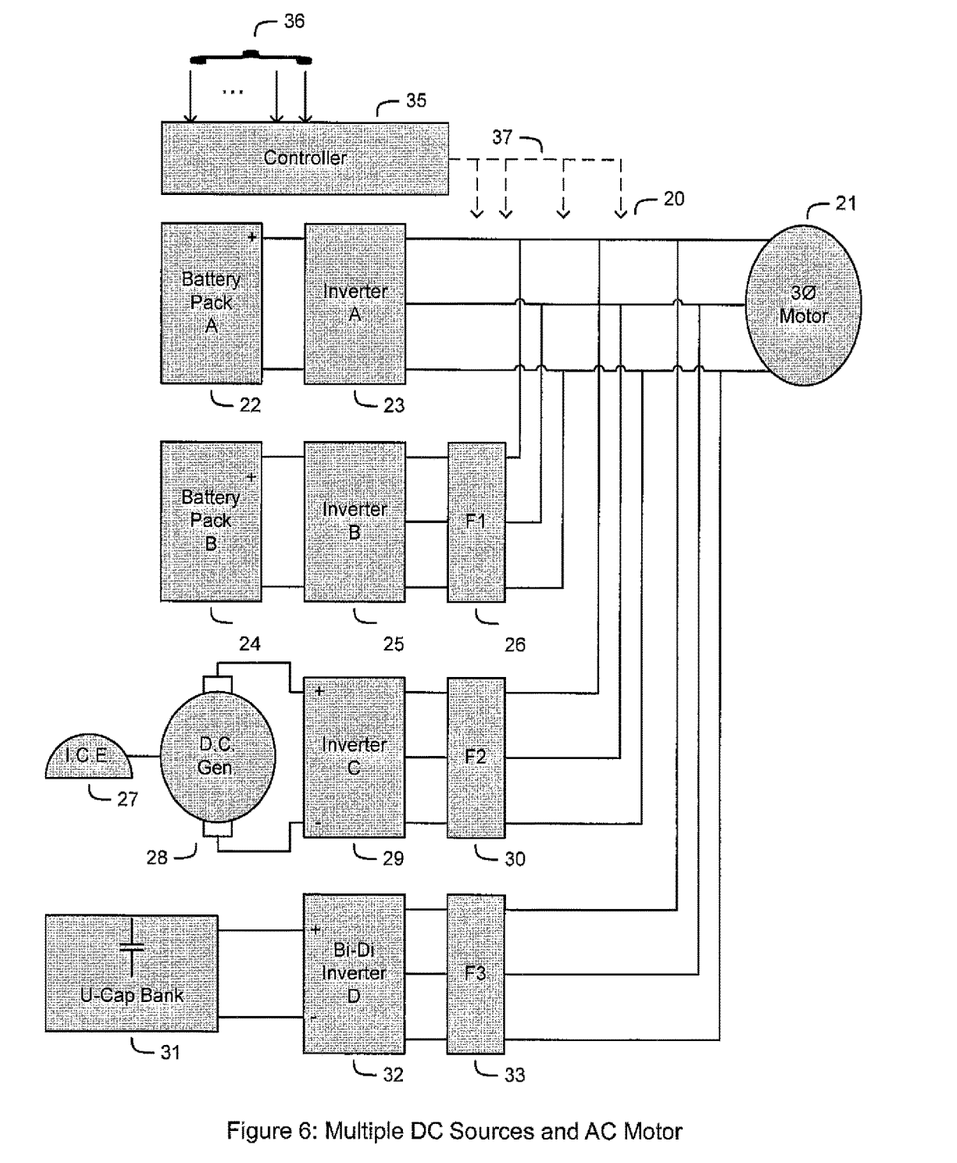
FIG. 6 is a block diagram using a system of the type of the first embodiment of this invention as configured to operate with four separate DC voltage sources as found in a series hybrid vehicle.

FIG. 6 shows a system 20 depicting the use of a single drive motor system of this invention sharing power from four DC power sources to drive a single three-phase motor 21. The application is a series hybrid vehicle. The battery packs 22 and 24 are partitioned to permit swapping out when depleted. Internal combustion engine (ICE) 27 drives a DC generator (or alternator with output rectifiers) 28. The fourth DC power source is ultra-capacitor bank 31 which stores energy recaptured during braking. Each of the four DC power sources (22,24,28, and 31) has it's associated inverter (23, 25, 29, and 32 respectively) feeding a common three-phase bus with filters 26, 30, and 33 isolating any switching transients among the inverters. Note that inverter 32 is bi-directional to permit charging of capacitor bank 31 during braking. Controller 35 fields all system sensor inputs 36 and controls all inverters, ICE 27 and DC generator 28 through output control data bus 37.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. Apparatus for sharing electric power between multiple energy sources in a vehicle or machine comprising:
   an AC electric motor;
   a first motor drive inverter for delivering a first AC current to AC motor wires of said electric motor;
   a first source of DC power for delivering a DC voltage to said first motor drive inverter;
   a second motor drive inverter for delivering AC current to said AC motor wires of said electric motor;
   a second source of DC electric power for delivering a DC voltage to said second motor drive inverter;
   a controller connected to both of said first and second motor drive inverters containing basic operational parameters and providing an interface to the vehicle or machine, whereby said controller distributes power between said first and second sources of DC according to varying torque demands of said electric motor, and whereby said second source of DC has most of the power capacity of said power sharing system for providing short bursts of power when required by said motor; and
   a switch for interrupting connection between said two inverters during ground faults or other system errors.

2. The apparatus of claim 1 wherein said second motor drive inverter delivers AC current to said AC motor wires through inductors or a low pass filter to facilitate filtering of unwanted switching transients between the two inverters.

3. The apparatus of claim 1 in which said first source of DC electric power is a battery pack.

4. The apparatus of claim 1 in which said second source of DC electric power is an ultra-capacitor bank and only said second motor drive inverter is bi-directional for providing regeneration during braking.

5. The apparatus of claim 3 in which said second source of DC electric power is an ultra-capacitor bank, whereby said ultra-capacitor bank meets temporary higher energy demands of said electric motor.

6. The apparatus of claim 5 having a device for sensing the phase of the AC power coming from one of said inverters to generate a simulated encoder signal for the second inverter.

7. The apparatus of claim 5 in which said apparatus provides drive in a vehicle whereby said second source of DC electric power is utilized for acceleration of said vehicle and regeneration of said battery pack.

8. The apparatus of claim 1 wherein said apparatus operates without the use of a DC to DC converter.

9. The apparatus of claim 1 having a manual power plug between said switch and said AC motor wires of said electric motor.

10. The apparatus of claim 1 in which said switch is controlled by said controller, said controller polling for said ground faults and other errors.

* * * * *